United States Patent
Chen

(10) Patent No.: US 8,497,839 B2
(45) Date of Patent: Jul. 30, 2013

(54) RECEIVING STRUCTURE OF RECEIVER OF WIRELESS INPUT DEVICE AND MOUSE HAVING THE RECEIVING STRUCTURE

(75) Inventor: Peter Chen, Sinjhuang (TW)

(73) Assignee: Key Mouse Electronic Enterprise Co., Ltd., New Taipei (TW)

( * ) Notice: Subject to any disclaimer, the term of this patent is extended or adjusted under 35 U.S.C. 154(b) by 826 days.

(21) Appl. No.: 12/713,172

(22) Filed: Feb. 26, 2010

(65) Prior Publication Data

US 2010/0220058 A1    Sep. 2, 2010

(30) Foreign Application Priority Data

Feb. 27, 2009   (TW) ............................... 98202994 U

(51) Int. Cl.
*G06F 3/033*   (2006.01)
(52) U.S. Cl.
USPC .......................................... 345/163; 345/157

(58) Field of Classification Search
USPC .................................................. 345/156–168
See application file for complete search history.

(56) References Cited

U.S. PATENT DOCUMENTS 8,212,771 B1 *   7/2012   Sanchez-Garcia ............ 345/161
2008/0256461 A1 * 10/2008  Aksemit et al. ............... 715/753

* cited by examiner

*Primary Examiner* — Vijay Shankar
(74) *Attorney, Agent, or Firm* — Chun-Ming Shih; HDLS IPR Services

(57) ABSTRACT

A mouse includes a device main body, a magnetic component and a receiver. The device main body is comprised of a shell of a wireless input device and is arranged a receiving case. The magnetic component and an accommodation part shown as a hollow configuration are arranged in the receiving case. An opening of the receiving case is formed on the accommodation part and faces the outside of the device main body. Corresponding to the accommodation part, the receiver can be placed into the accommodation part and generates magnetic attraction with the magnetic component. In the invention, the device main body can also be a main body of mouse.

16 Claims, 7 Drawing Sheets

RECEIVING STRUCTURE OF RECEIVER OF WIRELESS INPUT DEVICE AND MOUSE HAVING THE RECEIVING STRUCTURE

BACKGROUND OF THE INVENTION

1. Field of the Invention

The present invention in general relates to an input device of computer, in particular, to a receiving structure of the receiver of an input device, like mouse, etc.

2. Description of Prior Art

Wireless control has become an indispensable function possessed by many 3C products today, such as input devices used in computer, for example, keyboard, mouse, etc., which have already gone into wireless range from wire-connection range. In the meantime, when user is using wireless input device, since the wireless input device usually needs a connection to the mainframe via its own receiver, the signal input into the input device by the user needs to be transmitted to the mainframe via the receiver. Therefore, under usage status, the receiver and the main body of the input device are taking-apart-able. However, when there is a necessity to carry the wireless input device to other places, this kind of separated structure will cause an inconvenience in terms of mobility.

In current market of wireless input device, it is also commonly seen that its receiver can be separately installed in the main body of the input device. The more usual way is to provide an accommodation trough in the main body of the input device, such that its receiver can be placed therein. However, the prior arts are mainly to adapt configuration tightness or by means of wedging-hook and etc. to reach the taking-apart-able assembly. Therefore, in terms of structure design, accuracy and strength are two important factors in consideration of the influence of the product endurance. For example, when user ruins the fixing structure of receiver, like, the wedging-hook mechanism because of carelessness, or when the compactness is insufficient in cooperation due to over wearing, it is then impossible for the receiver to be firmly assembled in the main body of the input device any more. So, the prior structure for receiving the receiver of wireless input device is poor in terms of endurance.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a receiving structure of receiver of wireless input device and a mouse having the receiving structure. In the invention, the metallic portion of the connection head of the receiver is applied to be cooperated with the magnetic attraction of magnetic component, like a magnet, to generate a firm combination and long endurance for two objects to be combined together.

Secondly, the invention is to provide a receiving structure of receiver of wireless input device, including a device main body, a magnetic component and a receiver. The device main body is comprised of a shell of a wireless input device and is arranged a receiving case. The magnetic component and an accommodation part shown as a hollow configuration are arranged in the receiving case. An opening of the receiving case is formed on the accommodation part and faces the outside of the device main body. Corresponding to the accommodation part, the receiver can be placed into the accommodation part and generates magnetic attraction with the magnetic component.

Thirdly, the invention is to provide a mouse having a receiving structure for a receiver. Based upon the aforementioned structure, the mouse of the invention further takes the aforementioned main body of input device as a shell of mouse, whereby a mouse having the receiving structure is thus obtained.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, not used to limit its executing scope. Any equivalent variation and modification made according to appended claims is all covered by the claims claimed by the present invention.

Figure 1:
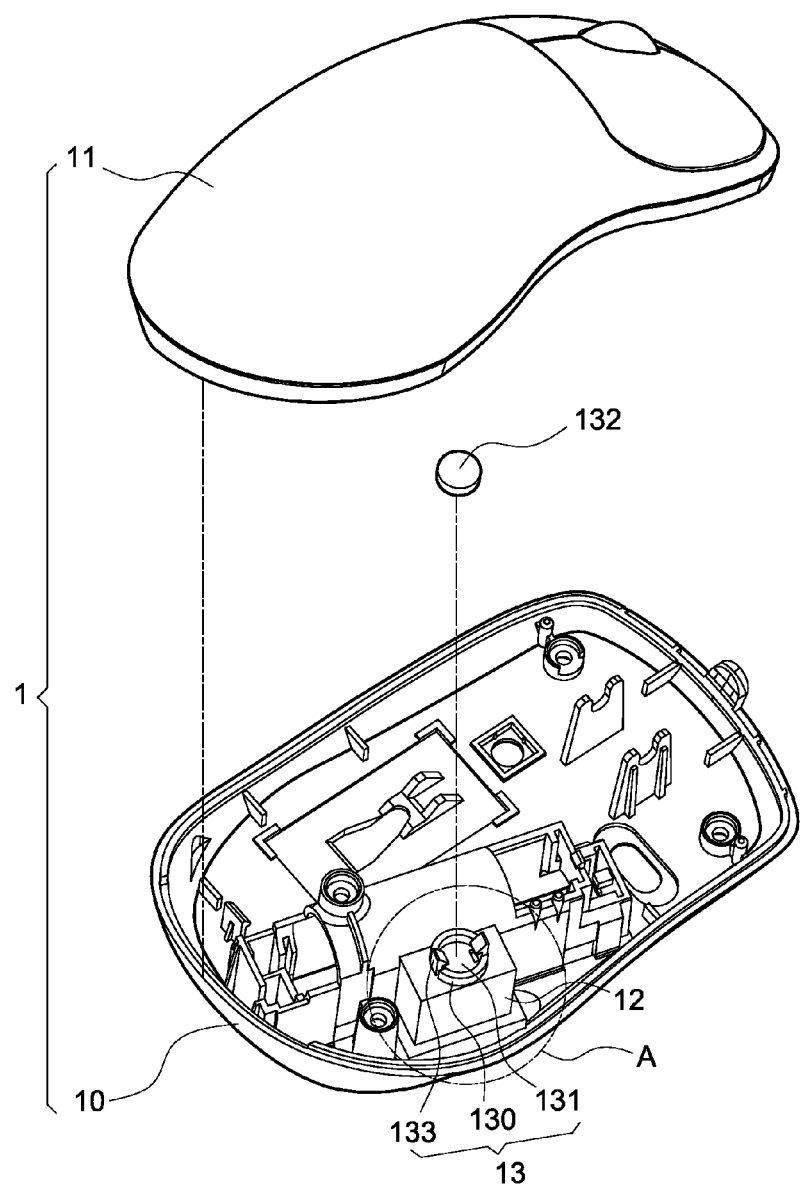
FIG. 1 is an internal structure of the first embodiment of the invention applied to a mouse.
Figure 3:
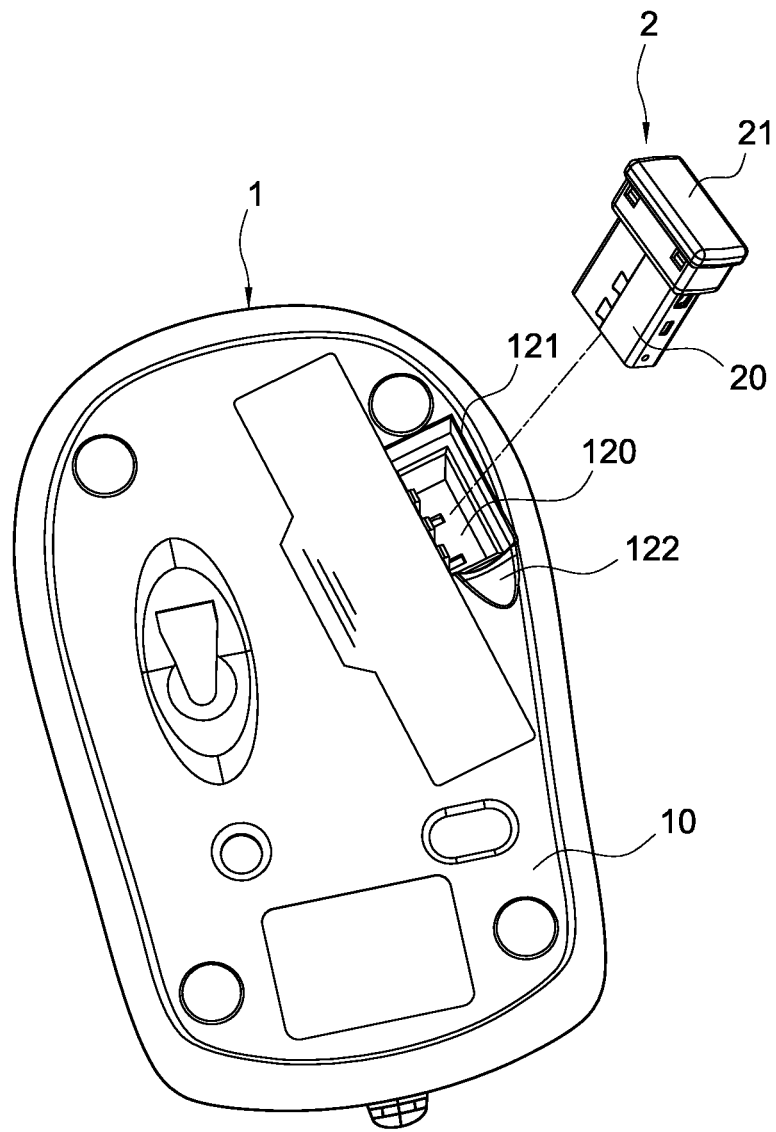
FIG. 3 is an illustration showing the assembly-corresponding relationship of the first embodiment of the invention applied to a mouse.

Please refer to FIG. 1 and FIG. 3, respectively showing an internal structural illustration and an assembly-corresponding illustration of the first embodiment of the invention applied to a mouse. The invention is mainly to provide a receiving structure of receiver of wireless input device and a mouse having the receiving structure, which includes a device main body 1, a magnetic component 132 and a receiver 2.

According to the first embodiment of the invention, the device main body 1 shown as a hollow shape is comprised of a shell of wireless input device, which can also be a mouse shell and includes a bottom seat 10 and an upper cover 11. In addition, in the device main body 1, there is a receiving case 12 adapted for the receiver 2 to be placed therein.

Figure 2:
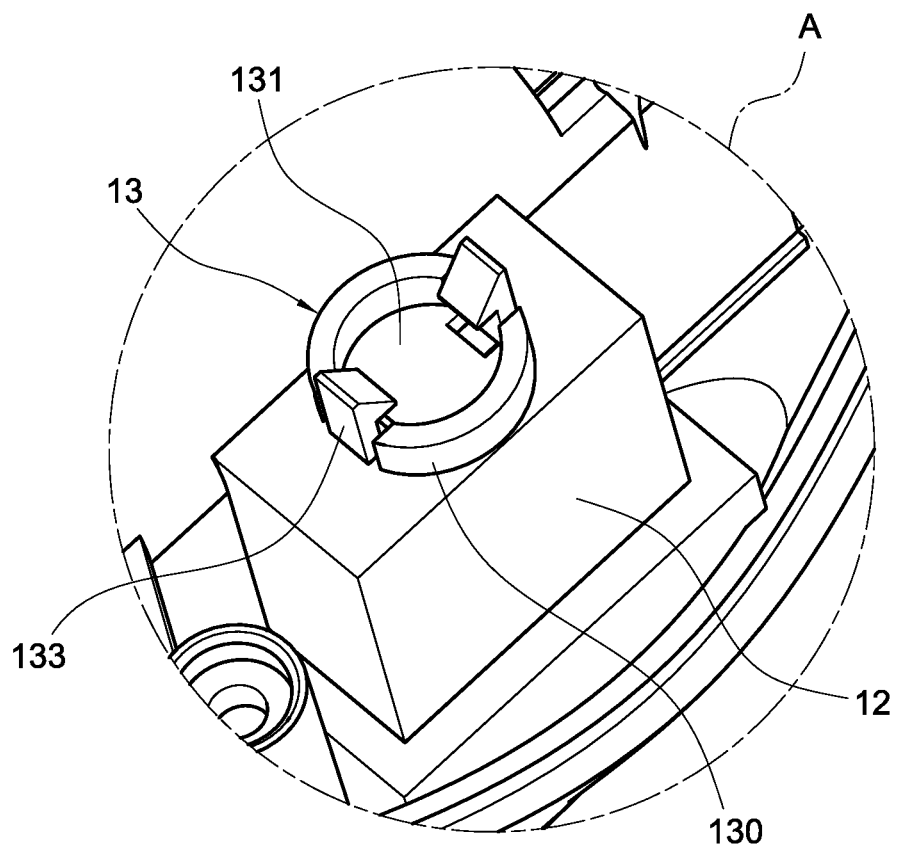
FIG. 2 is an enlarging illustration of "A" part in FIG. 1.

The magnetic component 132 can be a magnet to be arranged in the receiving case 12. When the receiver 2 is placed in the receiving case 12, the receiver 2 is firmly accommodated in the device main body 1 via the magnetic attraction generated between the magnetic component 132 and the metallic part of the receiver 2. Please refer to FIG. 2 together. In this case, the receiving case 12 is positioned on the bottom seat 10 further arranged a positioning seat 13 provided for the magnetic component 132 to be placed therein. The positioning seat 13 has a flange 130 shown as a projecting shape. In cooperation to the profile of the magnetic component 132, a positioning zone 131 shown as a hollow shape is formed in the flange 130. At least one barb part 133 projected upwardly is additionally arranged on the flange 130. After being placed into the positioning zone 131, the magnetic component 132 can be fastened by the barb part 133 to prevent dropping.

Figure 4:
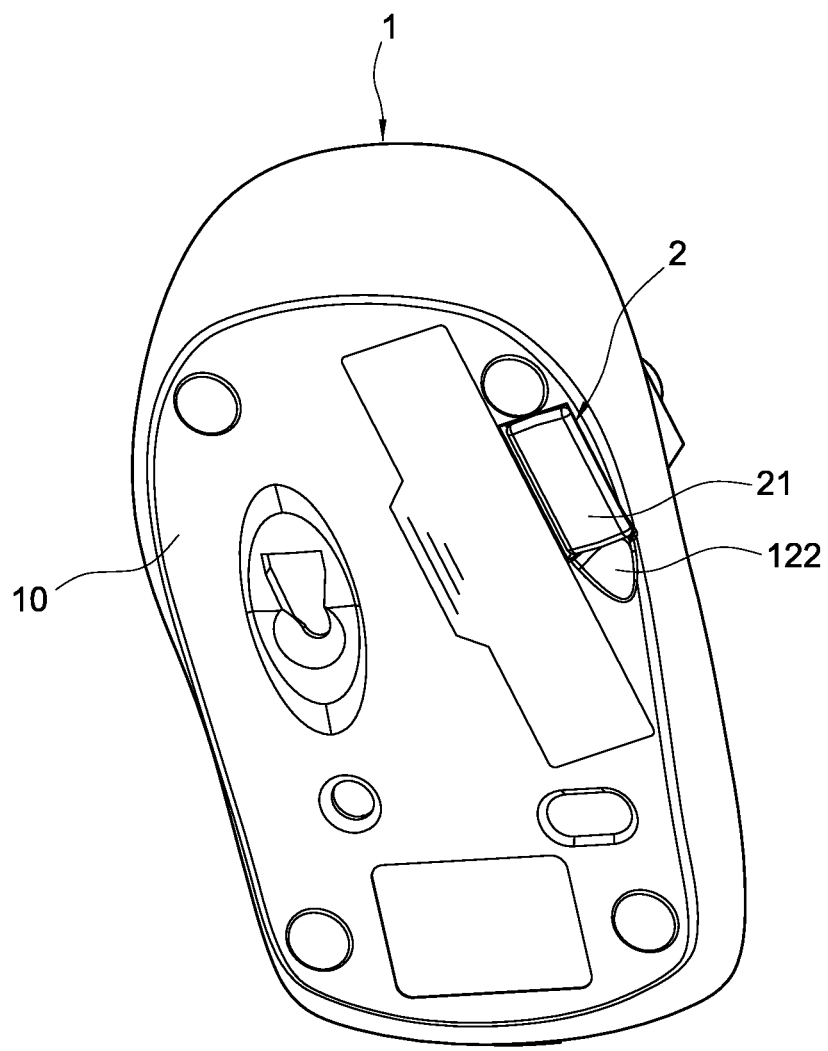
FIG. 4 is an illustration showing the assembly status of the first embodiment of the invention applied to a mouse.

When the wireless input device is in use, the receiver 2 is adapted for receiving the signals sent out from the wireless input device. The receiver 2 includes a connection head 20 and a receiving main body 21 arranged at the backside of the connection head 20. In this case, the connection head 20 can also be a USB connection head commonly used today or connection head of other specification. In addition, according to the present embodiment, the receiving case 12 positioned in the device main body 1 is arranged at an upright position, in which an accommodation part 120 shown as a hollow configuration is arranged. Moreover, an opening 121 of the receiving case 12 is formed on the accommodation part 120 and faces the outside of the device main body 1, such that the receiver 2 can be inserted into the accommodation part 120 from the outside of the device main body 1, at least making the connection head 20 be able to enter the accommodation part 120. Or, together with the receiving main body 21, the entire receiver 2 can be buried into the accommodation part 120. Then, together with the magnetic component 132 and through the connection head 20 (as shown in the figures) or other metallic part (not shown in the figures) on the receiver 2, a magnetic attraction is generated to hold the receiver 2 firmly in the device main body 1 (i.e., as shown in FIG. 4).

Figure 5:
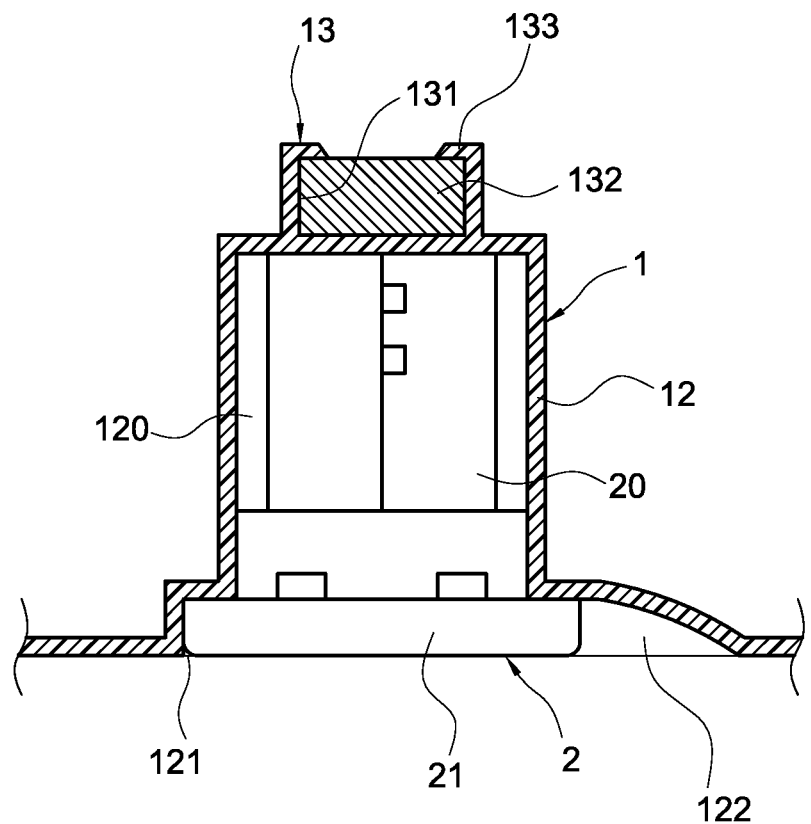
FIG. 5 is a partially sectional illustration showing the assembly status of the first embodiment of the invention applied to a mouse.

Furthermore, as shown in FIG. 5, in order to facilitate in taking out the receiver 2 after being installed, a notch 122 can be recessively arranged on the device main body 1 in connection with the opening 121 of the receiving case 12, such that a finger of a human hand can intrude therein to pull up the receiver 2 and take it out.

Figure 6:
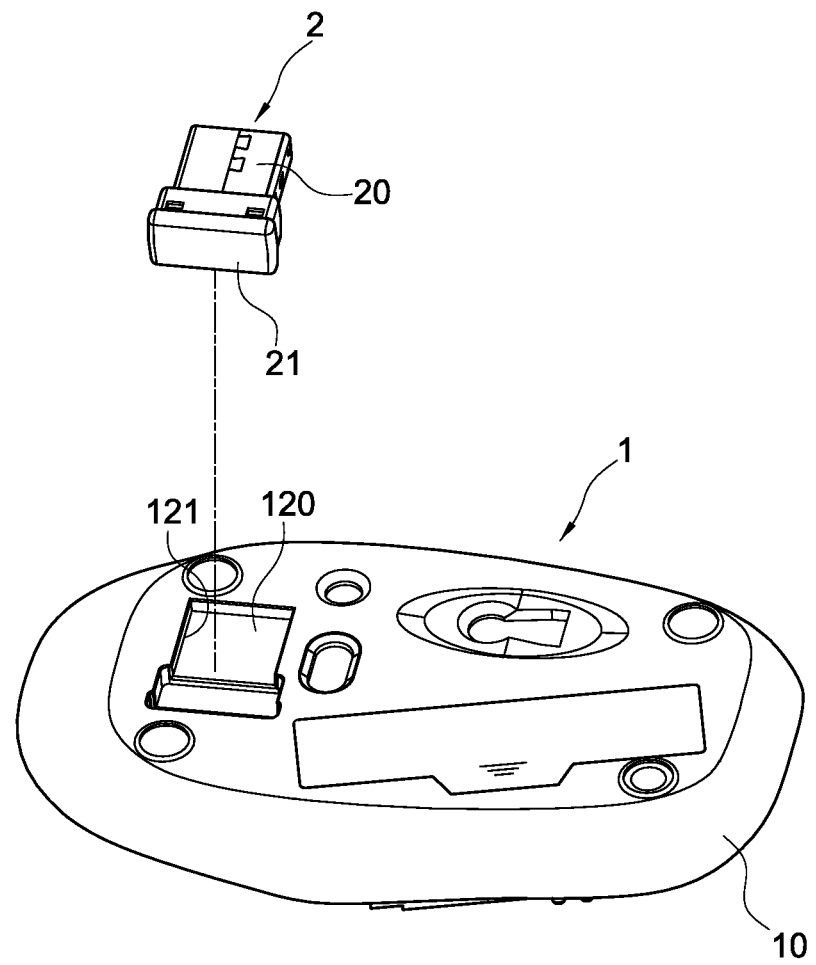
FIG. 6 is an illustration showing the assembly-corresponding relationship of the second embodiment of the invention applied to a mouse.
Figure 7:
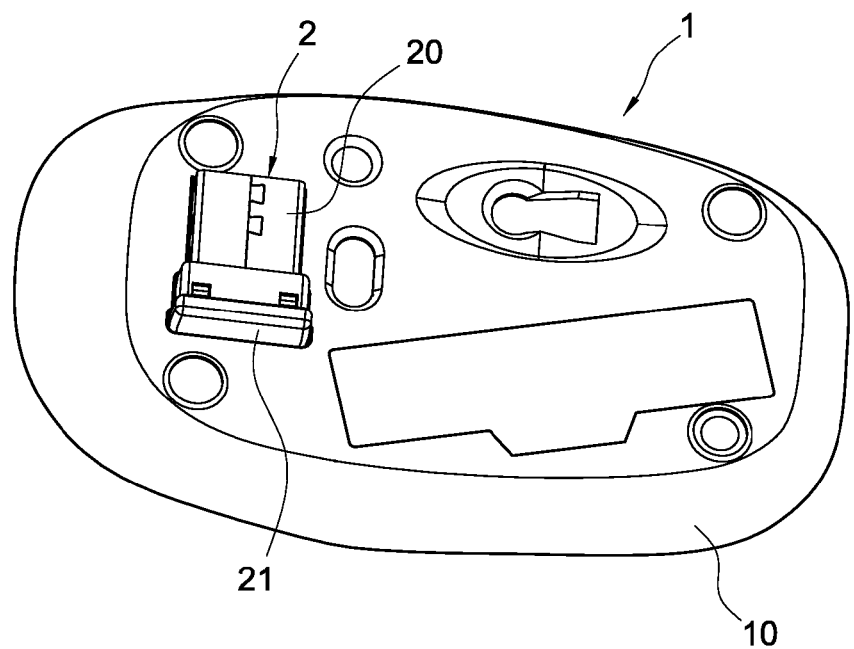
FIG. 7 is an illustration showing the assembly status of the second embodiment of the invention applied to a mouse.
Figure 8:
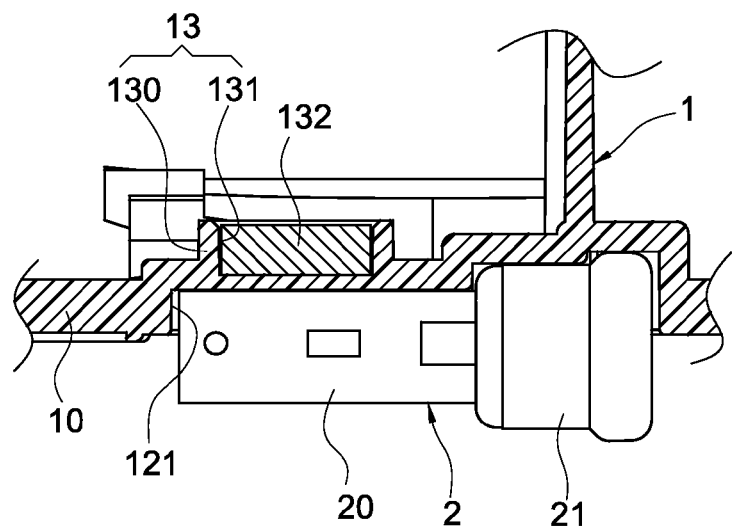
FIG. 8 is a partially sectional illustration showing the assembly status of the second embodiment of the invention applied to a mouse.

In addition, as shown in FIG. 6 through FIG. 8, according to the second embodiment of the invention, the receiver 2 can be also arranged at a horizontal position. After the receiver 2 in cooperation is placed into the receiving case 12 in a horizontal posture, the same magnetic component 132 will be also used to fix the receiver 2 firmly.

Therefore, through the constitution of aforementioned assemblies, a receiving structure of receiver of wireless input device according to the present invention is thus obtained. Moreover, as described in the aforementioned, the device main body 1 can also be a mouse shell, so a mouse having a receiving structure of receiver according to the present invention is thus obtained.

Summarizing aforementioned description, the receiving structure of receiver of wireless input device and a mouse having the receiving structure according to the present invention are an indispensable device and structure for a computer-related industry indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A receiving structure of receiver of wireless input device, including: a device main body, which is comprised of a shell of a wireless input device and is arranged a receiving case, which has an accommodation part shown as a hollow configuration, on which an opening of the receiving case is formed, which faces an outside of the device main body; a magnetic component, which is arranged in the receiving case; and a receiver, by corresponding to the accommodation part of the receiving case, which is placed into the accommodation part and generates a magnetic attraction with the magnetic component; wherein the receiving case is further arranged a positioning seat which has a flange shown as a projecting shape, in which a hollow positioning zone in cooperation with a profile of the magnetic component is formed, in which the magnetic component is arranged; wherein the flange is further arranged a projecting barb part adapted for fastening the magnetic component to prevent a dropping.

2. The receiving structure of receiver of wireless input device according to claim 1, wherein the device main body includes a bottom seat and an upper cover, and the receiving case is positioned on the bottom seat.

3. The receiving structure of receiver of wireless input device according to claim 1, wherein the device main body is recessively arranged a notch which is in connection with the opening of the receiving case and adapted for a finger of a human hand to stretch therein and take out the receiver after a pull.

4. The receiving structure of receiver of wireless input device according to claim 1, wherein the receiving case positioned in the device main body is arranged as an upright configuration.

5. The receiving structure of receiver of wireless input device according to claim 1, wherein the receiving case positioned in the device main body is arranged as a horizontal configuration.

6. The receiving structure of receiver of wireless input device according to claim 1, wherein the receiver includes a connection head and a receiving main body arranged at a backside of the connection head, and the magnetic attraction is generated between the magnetic component and the metallic part of the connection head.

7. The receiving structure of receiver of wireless input device according to claim 6, wherein the connection head is a USB.

8. The receiving structure of receiver of wireless input device according to claim 1, wherein the magnetic component is a magnet.

9. A mouse having receiving structure of receiver, including: a mouse shell, which is comprised of a receiving case, which has an accommodation part shown as a hollow configuration, on which an opening of the receiving case is formed, which faces an outside of the mouse shell; a magnetic component, which is arranged in the receiving case; and a receiver, by corresponding to the accommodation part of the receiving case, which can be placed into the accommodation part and generates a magnetic attraction with the magnetic component; wherein the receiving case is further arranged a positioning seat which has a flange shown as a projecting shape, in which a hollow positioning zone in cooperation with a profile of the magnetic component is formed, in which the magnetic component is arranged; wherein the flange is further arranged a projecting barb part adapted for fastening the magnetic component to prevent a dropping.

10. The mouse having receiving structure of receiver according to claim 9, wherein the mouse shell includes a bottom seat and an upper cover, and the receiving case is positioned on the bottom seat.

11. The mouse having receiving structure of receiver according to claim 9, wherein the mouse shell is recessively arranged a notch which is in connection with the opening of the receiving case and adapted for a finger of a human hand to stretch therein and take out the receiver after a pull.

12. The mouse having receiving structure of receiver according to claim 9, wherein the receiving case positioned in the mouse shell is arranged as an upright configuration.

13. The mouse having receiving structure of receiver according to claim 9, wherein the receiving case positioned in the mouse shell is arranged as a horizontal configuration.

14. The mouse having receiving structure of receiver according to claim 9, wherein the receiver includes a connection head and a receiving main body arranged at a backside of the connection head, and the magnetic attraction is generated between the magnetic component and the metallic part of the connection head.

15. The mouse having receiving structure of receiver according to claim 14, wherein the magnetic component is a magnet.

16. The mouse having receiving structure of receiver according to claim 9, wherein the connection head is a USB.

\* \* \* \* \*